United States Patent
Kanaya et al.

(10) Patent No.: US 8,770,560 B2
(45) Date of Patent: Jul. 8, 2014

(54) ELECTROMAGNETIC ACTUATOR AND FLUID-FILLED ACTIVE VIBRATION DAMPING DEVICE USING THE SAME

(75) Inventors: Tomohiro Kanaya, Kasugai (JP); Takehiro Okanaka, Kasugai (JP); Koji Imuta, Wako (JP)

(73) Assignees: Tokai Rubber Industries, Ltd., Komaki-shi (JP); Honda Motor Co., Ltd., Tokyo (JP)

( * ) Notice: Subject to any disclaimer, the term of this patent is extended or adjusted under 35 U.S.C. 154(b) by 102 days.

(21) Appl. No.: 13/424,623

(22) Filed: Mar. 20, 2012

(65) Prior Publication Data

US 2012/0200021 A1   Aug. 9, 2012

Related U.S. Application Data (63) Continuation of application No. PCT/JP2010/006970, filed on Nov. 30, 2010.

(30) Foreign Application Priority Data

Dec. 9, 2009 (JP) ................................. 2009-279659
Jul. 29, 2010 (JP) ................................. 2010-170241

(51) Int. Cl.
*F16F 5/00* (2006.01)

(52) U.S. Cl.
USPC .................................. 267/140.14; 267/140.11

(58) Field of Classification Search
USPC ............. 267/140.14, 140.11, 140.13, 140.15, 267/219; 248/550, 636, 638
See application file for complete search history.

(56) References Cited

U.S. PATENT DOCUMENTS

| | | | |
|---|---|---|---|
| 7,128,311 B2 * | 10/2006 | Goto et al. ............... | 267/140.14 |
| 7,188,830 B2 * | 3/2007 | Kato et al. ............... | 267/140.14 |
| 2008/0136074 A1 | 6/2008 | Nemoto | |
| 2009/0009009 A1 | 1/2009 | Kon | |
| 2009/0039577 A1 | 2/2009 | Ishiguro et al. | |
| 2011/0101582 A1 | 5/2011 | Kanaya | |

FOREIGN PATENT DOCUMENTS

| | | |
|---|---|---|
| JP | 2002-340081 | 11/2002 |
| JP | 2005-172202 | 6/2005 |
| JP | 2007-064300 | 3/2007 |
| JP | 4016343 B2 | 12/2007 |

(Continued)

OTHER PUBLICATIONS

U.S. Appl. No. 13/364,616 to Satoshi Umemura, filed Feb. 2, 2012.

(Continued)

*Primary Examiner* — Pamela Rodriguez
(74) *Attorney, Agent, or Firm* — Oliff PLC (57) ABSTRACT

An electromagnetic actuator wherein an annular supporting member secured to a stator and an oscillator member secured to a movable member are disposed in opposition in an axis-perpendicular direction and are elastically linked by a supporting rubber elastic body disposed therebetween. One axial face of the supporting rubber elastic body is furnished with an inside peripheral recessed portion and an outside peripheral protruding portion while another axial face is furnished with an inside peripheral protruding portion and an outside peripheral recessed portion so as to establish in the supporting rubber elastic body an elastic center axis that curves along a sinuous trajectory of an interconnected peak segment and valley segment situated between opposing faces of the annular supporting member and the oscillator member in the axis-perpendicular direction.

15 Claims, 6 Drawing Sheets

(56) References Cited

FOREIGN PATENT DOCUMENTS

| JP | 2008-128352 | 6/2008 |
| JP | 2009-014151 | 1/2009 |
| JP | 2009-047201 | 3/2009 |

OTHER PUBLICATIONS

U.S. Appl. No. 13/414,866 to Hironori Koyama et al., filed Mar. 8, 2012.

U.S. Appl. No. 13/414,882 to Mutsumi Muraoka et al., filed Mar. 8, 2012.

U.S. Appl. No. 13/415,049 to Hironori Koyama et al., filed Mar. 8, 2012.

Jul. 19, 2012 International Preliminary Examination Report and Written Opinion issued in International Application No. PCT/JP2010/006970 (English Translation only).

* cited by examiner

ELECTROMAGNETIC ACTUATOR AND FLUID-FILLED ACTIVE VIBRATION DAMPING DEVICE USING THE SAME

INCORPORATED BY REFERENCE

This is a Continuation of International Application No. PCT/JP2010/006970 filed on Nov. 30, 2010. The entire disclosure of the prior application is hereby incorporated by reference herein in its entirety.

BACKGROUND OF THE INVENTION

1. Field of the Invention

The present invention relates to an electromagnetic actuator adapted to utilize as actuating force magnetic attractive force produced by energizing a coil; and to a fluid-filled active vibration damping device employing the same.

2. Description of the Related Art

In the field of actuators utilized for example as actuating force generation sources in one class of vibration damping devices, namely fluid-filled active vibration damping devices, the use of electromagnetic actuators is known. An electromagnetic actuator includes a stator provided with a coil, and a movable member capable of displacement in the axial direction of the coil with respect to the stator; through the action of a magnetic field generated by energizing the coil, attractive force arises between the movable member and the stator, causing the movable member to experience relative displacement in the axial direction with respect to the stator. Additionally, an oscillator member attached to the movable member is linked by a supporting rubber elastic body to an annular support member attached to the stator, and when energization of the coil ceases and the attractive force disappears, the movable member is restored to its original position with respect to the stator by the recovery force of the supporting rubber elastic body. It is accordingly possible to bring about oscillatory displacement of the oscillator member through ON/OFF control of current through the coil. Such an arrangement is disclosed in Japanese Patent No. 4016343.

By providing a missing section in the magnetic path formed around the coil in order to define a magnetic pole defining portion, attractive force arising from the magnetic force acting between the movable member and the stator is exerted between this magnetic pole and the ferromagnetic movable member. Because the magnitude of the attractive force arising from magnetism in this way is inversely proportional to the square of the distance separating the magnetic pole defining portion and the movable member in the axial direction, the smaller the distance separating them, the more efficiently the actuating force will act on the movable member.

However, as noted earlier, because attractive force is inversely proportional to the square of the separation distance, if the separation distance is small, there is a risk that the movable member will become difficult to control owing to the sharply increased attractive force, causing problems such as the movable member striking against other components as a result of excessive displacement, and associated noise. It is therefore necessary to ensure a sufficiently large distance separating the movable member and the magnetic pole defining portion, and this made it difficult for actuating energy to be realized efficiently.

SUMMARY OF THE INVENTION

It is therefore an object of the present invention to provide an electromagnetic actuator of novel design whereby in a zone defined by a small separation distance between the stator and the movable member so as to afford excellent energy efficiency, oscillatory displacement of the oscillator member may be achieved in an efficient and consistent manner and without producing noise; as well as a fluid-filled active vibration damping device employing the same.

A first mode of the invention provides an electromagnetic actuator including a stator having a stator magnetic path provided by yoke members attached about the circumference of the coil and a movable member disposed in the center hole of the coil, the movable member being actuated in the axial direction of the coil through the action of a magnetic field generated by energizing the coil, the electromagnetic actuator being characterized in that: an annular supporting member secured to the stator and an oscillator member secured to the movable member are disposed in opposition across a gap in the axis-perpendicular direction; a supporting rubber elastic body of annular plate shape is disposed between the opposing faces of the annular supporting member and the oscillator member in the axis-perpendicular direction, and the oscillator member is elastically linked to the annular supporting member by the supporting rubber elastic body; and one axial face of the supporting rubber elastic body is furnished with an inside peripheral recessed portion and an outside peripheral protruding portion while another axial face of the supporting rubber elastic body is furnished with an inside peripheral protruding portion and an outside peripheral recessed portion so as to establish in the supporting rubber elastic body an elastic center axis that curves along a sinuous trajectory of an interconnected peak segment and valley segment situated between the opposing faces of the annular supporting member and the oscillator member in the axis-perpendicular direction.

According to the electromagnetic actuator constructed in accordance with the first mode, a small separation distance is established between the movable member and the stator, making it possible to efficiently attain high output. Specifically, by giving the supporting rubber elastic body specific sinuous contours, the spring constant of the supporting rubber elastic body is kept to a minimum during the initial phase of actuated displacement of the movable member, while allowing the spring constant of the supporting rubber elastic body to increase in nonlinear fashion with increasing displacement of the movable member. Thus, the increasing level of magnetic attractive force associated with displacement of the movable member towards the stator is cancelled out by nonlinear increase of the elastic force of the supporting rubber elastic body, thus reducing the kinetic energy of the movable member. Consequently, even where the initial separation distance of the movable member from the stator has been made smaller so that the movable member experiences oscillatory displacement in a stroke zone affording efficient production of actuating force, excessive displacement of the movable member is prevented, and striking of the movable member against other components and the attendant noise may be avoided.

A second mode of the present invention provides the electromagnetic actuator according to the first mode wherein the movable member undergoes reciprocating oscillatory displacement on the basis of alternating action of actuating force exerted on the movable member by the action of the magnetic field generated by energizing the coil, and of elastic recovery force of the supporting rubber elastic body upon experiencing deformation in association with displacement of the movable member.

According to the second mode, nonlinear change in the spring constant of the supporting rubber elastic body is utilized to bring about actuated displacement of the movable member in one direction through the action of a magnetic field, and actuated displacement of the movable member in the opposite direction through the elastic recovery force of the supporting rubber elastic body, to bring about reciprocating oscillatory displacement of the movable member with good energy efficiency.

A third mode of the present invention provides the electromagnetic actuator according to the first or second mode wherein at least one inflection point is established on the elastic center axis of the supporting rubber elastic body.

According to the third mode, the smooth contours of the supporting rubber elastic body in zones where inflection points have been established serve to prevent concentrations of stress from developing, thus affording improved durability.

A fourth mode of the present invention provides the electromagnetic actuator according to the third mode wherein a single inflection point is provided on the elastic center axis of the supporting rubber elastic body, and the elastic center axis curves along the sinuous trajectory of the interconnected peak segment and valley segment situated to either side of the inflection point.

According to the fourth mode, a single inflection point is provided on the elastic center axis of the supporting rubber elastic body to obtain a supporting rubber elastic body having an elastic center axis with sinuous contours of the interconnected peak segment and valley segment, so as to achieve the nonlinear spring characteristics mentioned above while affording an electromagnetic actuator having excellent output efficiency.

A fifth mode of the present invention provides the electromagnetic actuator according to any of the first to fourth modes wherein an inside peripheral anchoring face lying towards the oscillator member to which an inside peripheral edge of the supporting rubber elastic body is anchored, and an outside peripheral anchoring face lying towards the annular supporting member to which an outside peripheral edge of the supporting rubber elastic body is anchored, are disposed in relative eccentricity in the axial direction of the coil; in an inside peripheral section of the supporting rubber elastic body, the one axial face which is situated on an opposite side from the axial direction of relative eccentricity of the outside peripheral anchoring face with respect to the inside peripheral anchoring face has a slope angle with a minimum value of 90 degrees or less with respect to an axial line extending through an inside peripheral corner of the one axial face; and in an outside peripheral section of the supporting rubber elastic body, the other axial face situated on an opposite side from the axial direction of relative eccentricity of the inside peripheral anchoring face with respect to the outside peripheral anchoring face has a slope angle with a minimum value of 90 degrees or less with respect to an axial line extending through an outside peripheral corner of the other axial face.

According to the fifth mode, the inside peripheral section and outside peripheral section of the supporting rubber elastic body are imparted with greater recessed depth or projecting height, thereby imparting larger amplitude to the sinuous trajectory of the elastic center axis. Consequently, the nonlinear spring characteristics of the supporting rubber elastic body may be expressed more advantageously, to more effectively attain efficient output by the electromagnetic actuator, as well as preventing striking noise of the movable member.

A sixth mode of the present invention provides the electromagnetic actuator according to any of the first to fifth modes wherein the elastic center axis of the supporting rubber elastic body intersects at least at one location in a lengthwise medial section a reference line consisting of a straight line connecting a location on the annular supporting member and a location on the oscillator member along the elastic center axis.

According to the sixth mode, the elastic center axis of the supporting rubber elastic body curves along a sinuous trajectory that is alternately concave and convex in the vertical, whereby nonlinear spring characteristics of the supporting rubber elastic body in relation to actuated displacement of the movable member are effectively realized, to afford efficient output characteristics while avoiding the occurrence of striking noise.

A seventh mode of the present invention provides an fluid-filled active vibration damping device including a first mounting member disposed spaced apart from an axial opening of a second mounting member having cylindrical shape, with a main rubber elastic body linking the first mounting member and the second mounting member; having formed therein a pressure-receiving chamber a portion of whose wall is defined by the main rubber elastic body and an equilibrium chamber a portion of whose wall is defined by a flexible film, the pressure-receiving chamber and the equilibrium chamber being filled with a non-compressible fluid; and having an orifice passage interconnecting the pressure-receiving chamber and the equilibrium chamber, the fluid-filled active vibration damping device being characterized in that: the device comprises the electromagnetic actuator according to any of the first to sixth modes; another portion of the wall of the pressure-receiving chamber is defined by the oscillator member; the annular supporting member is secured to the second mounting member; and the oscillator member and the annular supporting member are linked by the supporting rubber elastic body.

According to the fluid-filled active vibration damping device constructed in accordance with the seventh mode, by employing the electromagnetic actuator of the present invention, oscillatory force can be efficiently brought to bear on pressure-receiving chamber by the oscillator member, to advantageously achieve active vibration damping action through control of pressure in the pressure-receiving chamber.

According to the present invention, the supporting rubber elastic body is endowed with nonlinear spring characteristics by establishing in the axis-perpendicular direction of the supporting rubber elastic body an elastic center axis having a sinuous trajectory of an interconnected peak segment and valley segment. Consequently, even where the distance separating the movable member and the stator is small so as to give rise to strong magnetic attractive force between the movable member and the stator, the displacement speed of the movable member is reduced by the elastic force of the supporting rubber elastic body, preventing the movable member from striking against other components due to excessive displacement, as well as avoiding the attendant noise. As a result, it is possible to bring about actuated displacement of the movable member in a stroke zone a small distance away from the magnetic pole on the stator side, so that generative force may be produced efficiently.

BRIEF DESCRIPTION OF THE DRAWINGS

The foregoing and/or other objects, features and advantages of the invention will become more apparent from the following description of a preferred embodiment with reference to the accompanying drawings in which like reference numerals designate like elements and wherein.

DETAILED DESCRIPTION OF PREFERRED EMBODIMENTS

The embodiments of the present invention are described below with reference to the accompanying drawings.

Figure 1:
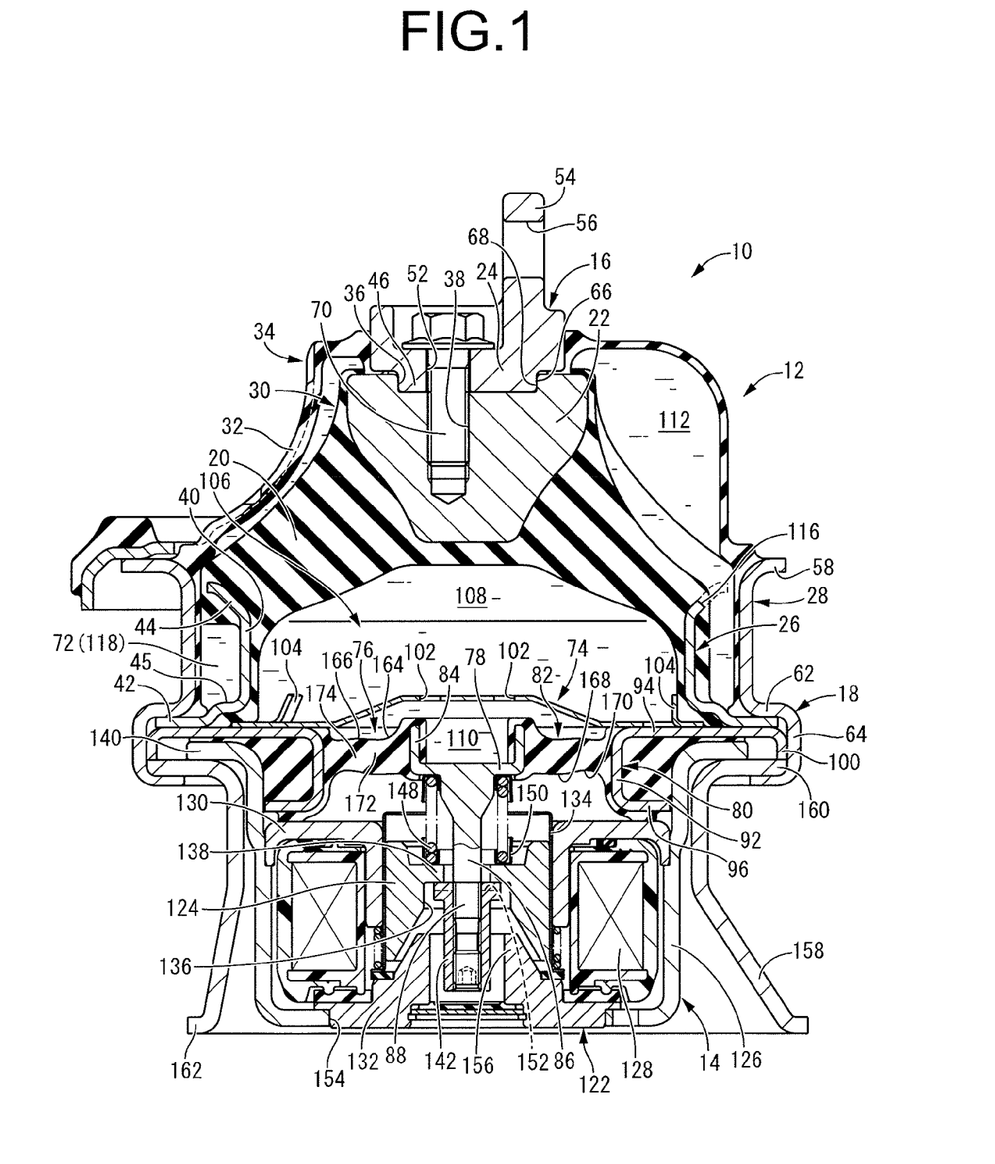
FIG. 1 is an elevational view in axial or vertical cross section of a fluid-filled active vibration damping device in the form of an engine mount, which is constructed according to a first embodiment of the present invention.

FIG. 1 depicts an automotive engine mount 10 according to a first embodiment of the fluid-filled active vibration damping device constructed according to the present invention. The engine mount 10 is constructed of an electromagnetic actuator 14 attached to a mount body 12. The mount body 12 has a construction in which a first mounting member 16 and a second mounting member 18 are elastically linked by a main rubber elastic body 20; the first mounting member 16 is mounted on the power unit (not shown) of a car while the second mounting member 18 is mounted onto the car body (not shown) to provide the power unit with vibration-damped support on the body. In this installed condition, the distributed load of the power unit and the vibration primarily targeted for damping are both input across the first mounting member 16 and the second mounting member 18, in the generally axial direction of the engine mount 10 (the vertical direction in FIG. 1). In the following discussion, as a general rule the vertical direction refers to the vertical direction in FIG. 1.

Turning to a more detailed description, the first mounting member 16 is composed of a main rubber inner fitting 22 and a flexible film inner fitting 24, while the second mounting member 18 is composed of a main rubber outer fitting 26 and a flexible film outer fitting 28. The main rubber inner fitting 22 and the main rubber outer fitting 26 are vulcanization bonded to the main rubber elastic body 20 and constitute a first integrally vulcanization molded component 30, while the flexible film inner fitting 24 and the flexible film outer fitting 28 are vulcanization bonded to a flexible film 32 and constitute a second integrally vulcanization molded component 34; and the first and second integrally vulcanization molded components 30, 34 are assembled together.

The main rubber inner fitting 22 which is part of the first integrally vulcanization molded component 30 has inverted, generally truncated conical shape. A mating recess 36 is formed in the upper end face (the large-diameter end face) of the main rubber inner fitting 22, and a screw hole 38 opens out onto the bottom face of the mating recess 36.

The main rubber outer fitting 26 is furnished with a cylindrical wall portion 40 of generally large-diameter round cylindrical shape, with a flanged portion 42 that extends diametrically outward integrally formed in the axial lower end section of the cylindrical wall portion 40, and with a tapered cylindrical section 44 that progressively flares outward moving axially upward, situated in the axial upper end section of the cylindrical wall portion 40. This has the effect of creating on the outside peripheral side of the main rubber outer fitting 26 a circumferential groove 45 that opens onto the outside peripheral face and extends in the circumferential direction for a distance just short of once around the circumference. The main rubber inner fitting 22 is positioned above and away from the main rubber outer fitting 26 and is aligned on generally the same center axis therewith so that the outside peripheral face of the inverted tapering contours of the main rubber inner fitting 22 and the inside peripheral face of the tapered cylindrical section 44 in the main rubber outer fitting 26 are disposed in opposition and spaced apart from one another, with the opposing faces of the main rubber inner fitting 22 and the main rubber outer fitting 26 elastically linked by the main rubber elastic body 20.

The main rubber elastic body 20 has large-diameter truncated conical shape overall, and in the center section thereof the main rubber inner fitting 22 is coaxially aligned and vulcanization bonded, while the tapered cylindrical section 44 of the main rubber outer fitting 26 is juxtaposed against and vulcanization bonded to the outside peripheral face at the large-diameter end. The main rubber elastic body 20 thereby constitutes the first integrally vulcanization molded component 30 incorporating the main rubber inner fitting 22 and the main rubber outer fitting 26 as described above.

Meanwhile, the flexible film inner fitting 24 which is part of the second integrally vulcanization molded component 34 has thick, circular disk shape. A mating protrusion 46 is formed on the lower face of the flexible film inner fitting 24, and a passage hole 52 is formed passing through the region where this mating protrusion 46 is located. Additionally, an upward-projecting mounting plate portion 54 is integrally formed with the flexible film inner fitting 24, and a bolt passage hole 56 is provided in the center section of the projecting mounting plate portion 54.

The flexible film outer fitting 28 has thin, large-diameter round cylindrical shape, and at the opening situated at the axial upper end thereof there is integrally formed a mounting plate portion 58 that extends diametrically outward. A number of fastening bolts (not shown) are inset into the mounting plate portion 58. At the opening situated at the axial lower end of the flexible film outer fitting 28 there is integrally formed a flanged portion 62 of annular disk shape extending diametrically outward, and at the outside peripheral edge part of the flanged portion 62 there is integrally formed a swaging piece 64 of annular shape projecting downward in the axial direction.

The flexible film inner fitting 24 is positioned spaced apart to the axial upper side from the flexible film outer fitting 28 and aligned on generally the same center axis, with the flexible film inner fitting 24 and the flexible film outer fitting 28 connected by the flexible film 32.

The flexible film 32 is formed by a thin rubber film, and has generally annular disk shape extending in the circumferential direction with bowed cross sectional contours imparting slack sufficient to readily allow elastic deformation. The inside peripheral edge of the flexible film 32 is vulcanization bonded to the outside peripheral edge of the flexible film inner fitting 24, while the outside peripheral edge of the flexible film 32 is vulcanization bonded into the opening at the axial upper end of the flexible film outer fitting 28. The flexible film 32 thereby constitutes the second integrally vulcanization molded component 34 incorporating the flexible film inner fitting 24 and the flexible film outer fitting 28.

The second integrally vulcanization molded component 34 is juxtaposed from above and assembled together with the first integrally vulcanization molded component 30 described previously, the flexible film inner fitting 24 is anchored to the main rubber inner fitting 22 and the flexible film outer fitting 28 is anchored to the main rubber outer fitting 26, and the flexible film 32 is then positioned spaced apart to the outside of the main rubber elastic body 20 and arranged covering the entire outside peripheral face of the main rubber elastic body 20.

Specifically, the flexible film inner fitting 24 is juxtaposed directly against the upper face of the main rubber inner fitting 22, and the mating protrusion 46 of the flexible film inner fitting 24 is fitted within the mating recess 36 of the main rubber inner fitting 22, thereby centering the flexible film inner fitting 24 and the main rubber inner fitting 22 on the same center axis. In the present embodiment in particular, through interlocking action on the part of an interlocking outside peripheral face 66 formed on the outside peripheral face of the mating protrusion 46 and an interlocking inside peripheral face 68 formed by a notched pattern on the inside peripheral face of the mating recess 36, the flexible film inner fitting 24 and the main rubber inner fitting 22 are positioned in the circumferential direction with respect to one another, and the passage hole 52 of the flexible film inner fitting 24 is aligned with the screw hole 38 of the main rubber inner fitting 22.

With the main rubber inner fitting 22 and the flexible film inner fitting 24 juxtaposed as depicted in FIG. 1, a connecting bolt 70 is passed through the passage hole 52 of the flexible film inner fitting 24 and screwed into the screw hole 38 of the main rubber inner fitting 22. The main rubber inner fitting 22 and the flexible film inner fitting 24 are then connected securely by the connecting bolt 70 to form the first mounting member 16.

Meanwhile, the flexible film outer fitting 28 is slipped about the outside of the main rubber outer fitting 26 from above in the axial direction. The main rubber outer fitting 26 is positioned with the outside peripheral edge of the flanged portion 42 at its lower end juxtaposed against the flanged portion 62 of the flexible film outer fitting 28 in the axial direction, and with the rim of the opening of the tapered cylindrical section 44 at its upper end juxtaposed against the inside peripheral face of the flexible film outer fitting 28 in the diametrical direction.

The swaging piece 64 of the flexible film outer fitting 28 is then secured by swaging about the outside peripheral edge of the flanged portion 42 of the main rubber outer fitting 26 so that the main rubber outer fitting 26 and the flexible film outer fitting 28 are secured together, completing the assembly. Rubber seals integrally formed with the main rubber elastic body 20 or the flexible film 32 are respectively interposed in regions superimposed against the flexible film outer fitting 28 at the upper and lower edges of the main rubber outer fitting 26, to provide a fluid tight seal. The circumferential groove 45 formed in the main rubber outer fitting 26 is thus covered fluid tightly by the flexible film outer fitting 28, thereby defining a continuous annular passage 72 that extends a prescribed distance or about the entire circumference in the circumferential direction between the diametrically opposed faces of the cylindrical wall portion 40 of the main rubber outer fitting 26 and the flexible film outer fitting 28.

A partition plate fitting 74 and a supporting member 76 are attached at the lower opening of the main rubber outer fitting 26. The supporting member 76 has a structure in which an oscillator member 78 and an annular supporting member 80 disposed spaced apart in the axis-perpendicular direction are elastically linked by a supporting rubber elastic body 82 of generally annular plate shape.

Figure 2:
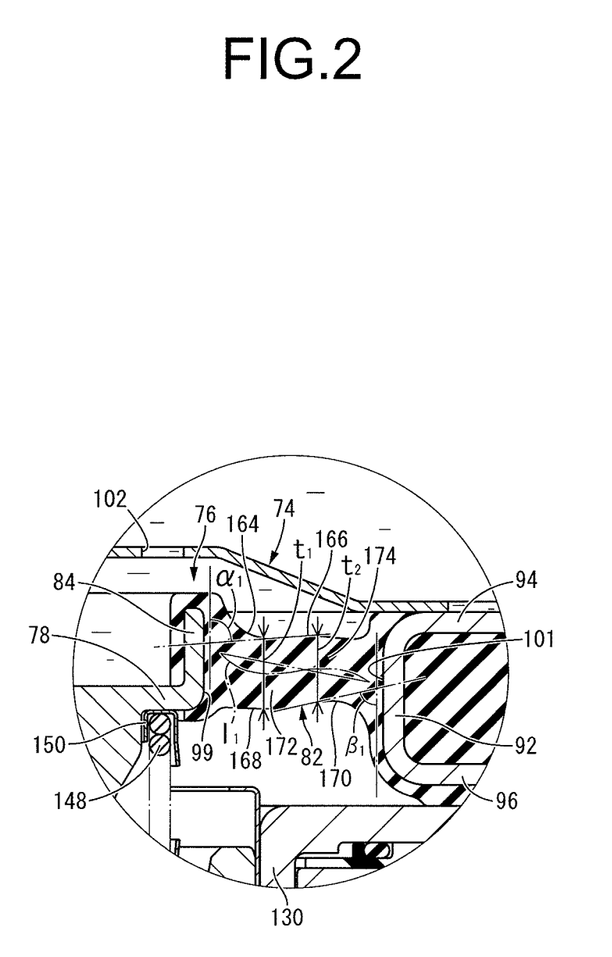
FIG. 2 is an enlarged view in axial or vertical cross section showing a principle part of the engine mount of FIG. 1.

The oscillator member 78 is shaped like a circular plate, with an annular connecting portion 84 of generally round cylindrical shape integrally formed in the outside peripheral portion thereof and projecting axially upward. In the center section of the oscillator member 78 there is integrally formed an actuator shaft 86 that extends downward. As shown in FIG. 2, a screw thread is provided in a portion of the actuator shaft 86 lying somewhat above the distal end section (which is the lower end in the drawing) and constitutes a male thread portion 88. The oscillator member 78, inclusive of the annular connecting portion 84 and the actuator shaft 86, is integrally molded of rigid material such as metal or a synthetic resin.

Meanwhile, the annular supporting member 80 includes an integrally formed mounting plate 94 and a positioning projection 96 that are respectively flanged out from the upper and lower openings of a cylindrical portion 92 of round cylindrical shape extending in the axial direction; and at the outside peripheral edge of the mounting plate 94 there is integrally formed a downward-projecting pressure fitting portion 100 with annular contours. The annular supporting member 80 is fabricated, for example, by subjecting a generally annular disk-shaped metal plate to pressing in its inside peripheral edge part and outside peripheral edge part to bend these downward, and to then subject the bottom edge of the downwardly-bent inside peripheral edge part to bending diametrically outward.

The supporting rubber elastic body 82 is arranged between the diametrically opposing faces of the annular supporting member 80 and the oscillator member 78, with the oscillator member 78 positioned spaced apart diametrically inward from the annular supporting member 80 and centered on generally the same center axis, and with the oscillator member 78 positioned eccentrically upward in the axial direction with respect to the annular supporting member 80. The supporting rubber elastic body 82 is vulcanization bonded at its inside peripheral face to the outside peripheral face of the annular connecting portion 84 of the oscillator member 78 (inside peripheral anchoring face 99), while its outside peripheral face is vulcanization bonded to the inside peripheral face of the cylindrical portion 92 of the annular supporting member 80 (outside peripheral anchoring face 101). The supporting rubber elastic body 82 thereby provides fluid-tight closure between the diametrically opposing faces of the oscillator member 78 and the annular supporting member 80. The inside peripheral anchoring face 99 and the outside peripheral anchoring face 101 are relatively eccentric in the axial direction, with the inside peripheral anchoring face 99 extending further upward in the axial direction than the outside peripheral anchoring face 101.

Meanwhile, the partition plate fitting 74 takes the shape of a thin disk, the outside diameter dimension of which is such as to reach the diametrical medial section of the mounting plate 94 of the annular supporting member 80. The center section of the partition plate fitting 74 protrudes upward in a shape resembling a plateau, and is perforated by a number of orifice passages 102. A number of fastener pieces 104 project upward along the circumference of the partition plate fitting 74 in proximity to its outside peripheral edge.

The partition plate fitting 74, positioned in the axis-perpendicular direction through the agency of the fastener pieces 104, is attached with its outside peripheral edge juxtaposed against the flanged portion 42 of the main rubber outer fitting 26 which has been attached at the lower opening of the flexible film outer fitting 28. Additionally, the supporting member 76 is attached to the lower opening of the flexible film outer fitting 28 from below the partition plate fitting 74, and the mounting plate 94 of the annular supporting member 80 in the supporting member 76 is juxtaposed against the main rubber outer fitting 26 and the partition plate fitting 74, with their respective outside peripheral edges secured swaged by the swaging piece 64 of the flexible film outer fitting 28. The first integrally vulcanization molded component 30, the second integrally vulcanization molded component 34, the partition plate fitting 74, and the supporting member 76 together constitute the mount body 12.

The lower opening of the flexible film outer fitting 28 is thereby covered fluid-tightly by the supporting member 76, thereby forming between the main rubber elastic body 20 and the supporting member 76 a pressure-receiving chamber 106 filled with a non-compressible fluid. Part of the wall of this pressure-receiving chamber 106 is defined by the main rubber elastic body 20, and the chamber is adapted to receive input of vibration and give rise to pressure fluctuations on the basis of elastic deformation of the main rubber elastic body 20 at times of input of vibration across the first mounting member 16 and the second mounting member 18. Another part of the wall of the pressure-receiving chamber 106 is defined by the supporting member 76.

The partition plate fitting 74 is disposed within the pressure-receiving chamber 106 thereby bifurcating the pressure-receiving chamber 106 and forming to either side of the partition plate fitting 74 a vibration input chamber 108 situated towards the main rubber elastic body 20 and an oscillation chamber 110 situated towards the supporting member 76, with the vibration input chamber 108 and the oscillation chamber 110 communicating through the orifice passages 102.

The main rubber elastic body 20 and the flexible film 32 are anchored at their inside peripheral edge and outside peripheral edge respectively to the first mounting member 16 and the second mounting member 18, thereby defining between the opposed faces of the main rubber elastic body 20 and the flexible film 32 an equilibrium chamber 112 which is filled with a non-compressible fluid. Specifically, part of the wall of this equilibrium chamber 112 is defined by the readily deformable flexible film 32, permitting the chamber to readily experience changes in volume on the basis of elastic deformation of the flexible film 32. The non-compressible fluid filling the pressure-receiving chamber 106 and the equilibrium chamber 112 is typically a low-viscosity fluid having viscosity of 0.1 Pa·s or lower, so as to efficiently achieve vibration damping based on resonance action of fluid flowing through an orifice passage 118 (to be discussed later) in the vibration frequency range required of the automotive engine mount 10.

Additionally, the second mounting member 18 is utilized in forming the continuous annular passage 72, and this continuous annular passage 72 communicates at a first circumferential end with the pressure-receiving chamber 106 through a passage hole (not shown), while the other circumferential end of the continuous annular passage 72 communicates with the equilibrium chamber 112 through a passage hole 116 formed in the main rubber elastic body 20. There is defined thereby an orifice passage 118 connecting the pressure-receiving chamber 106 and the equilibrium chamber 112 with one another to allow flow of fluid between the two chambers 106, 112, and extending for a prescribed length about the perimeter of the pressure-receiving chamber 106. The orifice passage 118 is tuned through appropriate selection of passage cross sectional area and passage length, so as to effectively give rise to vibration damping on the basis of resonance action of fluid flowing inside it on the basis of pressure differentials that arise between the pressure-receiving chamber 106 and the equilibrium chamber 112 at times of vibration input, and to do so in a prescribed frequency range, such as idling vibration for example.

The electromagnetic actuator 14, meanwhile, is disposed to the opposite side of the supporting member 76 from the pressure-receiving chamber 106. This electromagnetic actuator 14 includes a stator 122 and a movable member 124. The construction of the stator 122 includes a coil 128 fixedly attached to and housed within a housing 126 of generally inverted cup shape, and yoke members 130, 132 composed of ferromagnets of annular shape respectively attached fixedly about the perimeter of the coil 128 to form a stator magnetic path. An elastically positioned guide sleeve 134 is installed on the cylindrical inside peripheral face of the upper yoke member 130 forming the stator magnetic path, and the movable member 124, which consists of a ferromagnet, is slidably attached within the guide sleeve 134.

The movable member 124 is arranged inserted through the center hole of the coil 128, within the area of a magnetic gap formed between the yoke members 130, 132 which form a magnetic path, and through energization of the coil 128 is exposed to magnetic force which actuates it in the axial direction while guided by the guide sleeve 134. The movable member 124 has overall shape of a generally round cylinder with a passage hole 136 passing through in the axial direction, and its outside peripheral face is slidable along the guide sleeve 134, while an inwardly-projecting fastener projection 138 is formed in the axial upper part of the passage hole 136.

The electromagnetic actuator 14 is arranged with a flange portion 140 formed at the edge of the opening of the housing 126 juxtaposed against the mounting plate 94 of the annular supporting member 80 of the supporting member 76, and together with the annular supporting member 80 is secured swaged to the second mounting member 18 by the swaging piece 64. The electromagnetic actuator 14 is thereby attached with the center axis of slide of the movable member 124 generally aligned with the center axes of the first and second mounting members 16, 18.

With the electromagnetic actuator 14 attached in this manner, the actuator shaft 86 of the oscillator member 78 is inserted therein from above along the center axis, passing the actuator shaft 86 through the passage hole 136 of the movable member 124. A fastening member 142 of generally round cylindrical shape is then threadably attached at the distal end section of the actuator shaft 86 so that the movable member 124 is supported in nondetachable fashion from the actuator shaft 86.

A coil spring 148 is slipped about the outside of the actuator shaft 86 and arranged spanning between the opposing faces of the oscillator member 78 and the fastener projection 138 of the movable member 124, thereby positioning the actuator shaft 86 and the movable member 124 in the axial direction. Specifically, when the fastening member 142 is threaded onto the actuator shaft 86, the coil spring 148 is compressed between it and the oscillator member 78 through the agency of the fastener projection 138 of the movable member 124. The movable member 124 is thereby urged towards the direction of detachment from the actuator shaft 86 by the coil spring 148, while being supported in nondetachable fashion by the fastening member 142. As a result, the actuator shaft 86 and the movable member 124 are fixedly linked while positioned relative to one another in the axial direction.

A collar member 150 is disposed capping each end of the coil spring 148 to reduce wear caused by the coil spring 148 rubbing against the other components. Due to this substantially fixed linkage between the movable member 124 and the actuator shaft 86 in the axial direction, actuating force acting upon the movable member 124 through energization of the coil 128 is transmitted to the actuator shaft 86. A gap of prescribed size is provided between the axis-perpendicular-opposed inside peripheral face of the passage hole 136 of the movable member 124 and the actuator shaft 86, and between the axis-perpendicular-opposed faces of the fastening member 142 and the movable member 124.

In the fastening member 142, a slot 152 that extends continuously in the diametrical direction is formed in the axial upper end face juxtaposed against the fastener projection 138 of the movable member 124. With the fastening member 142 attached to the actuator shaft 86, the slot 152 defines a communicating passage between the juxtaposed faces of the fastening member 142 and the fastener projection 138 of the movable member 124 so that the spaces above and below the movable member 124 are maintained in a state of communication with one another through this communicating passage, thus avoiding the adverse effects created by an air spring inside a hermetic space.

A through-hole 154 passes through the center of the base wall of the housing 126 of the electromagnetic actuator 14, and the lower yoke member 132 which is positioned in opposition to the movable member 124 and exerts magnetic force thereon lies exposed to the outside through this through-hole 154. The center section of the lower yoke member 132 has increased thickness to resemble a peak shape providing a central projecting portion 156. This central projecting portion 156 intrudes into the guide sleeve 134 from below.

The lower yoke member 132 is magnetically connected with the housing 126 and the upper yoke member 130, and in cooperation with the housing 126 and the upper yoke member 130 forms a ring-shaped magnetic path about the perimeter of the coil 128. Inside the center hole of the coil 128 a magnetic gap situated between the upper yoke member 130 and the lower yoke member 132 is formed in the magnetic path, and the movable member 124 is arranged at a location corresponding to this magnetic gap. The movable member 124 is arranged to the inside peripheral side of the guide sleeve 134 from the upper yoke member 130, and is positioned above and spaced apart by a predetermined distance from the lower yoke member 132.

With this arrangement, when the coil 128 which is wound in the circumferential direction is energized, confronting magnetic poles are generated between the opposed faces of the upper and lower yoke members 130, 132 which define the magnetic gap. The movable member 124 which is arranged in this magnetic gap becomes subjected to actuating force towards the direction of minimized magnetic resistance, that is, actuating force towards the lower yoke member 132 in the axial direction. When energization of the coil 128 is interrupted, the movable member 124 returns to its original position in relation to the stator 122 on the basis of recovery force of the supporting rubber elastic body 82 vulcanization bonded to the oscillator member 78. By switching on and off the supply of power to the coil 128, the movable member 124 may be induced to undergo reciprocating actuation up and down in the axial direction under the alternating action of attractive force based on magnetism and recovery force based on elasticity of the supporting rubber elastic body 82. In the present embodiment, the supporting rubber elastic body 82 constitutes part of the electromagnetic actuator 14, as well as constituting part of the mount body 12.

In the engine mount 10 constructed as described above, a tubular bracket 158 is fitted about the outside of the electromagnetic actuator 14. The tubular bracket 158 has a flanged portion 160 at its upper opening, and this flanged portion 160 is secured swaged by the swaging piece 64 to the flexible film outer fitting 28, together with the flanged portion 42 of the main rubber outer fitting 26 and the mounting plate 94 of the annular supporting member 80. A mounting plate 162 is formed at the lower opening of the tubular bracket 158, and a number of mounting holes (not shown) are formed in this mounting plate 162.

While not depicted in the drawings, the engine mount 10 is installed between the power unit and the body of a car by mounting the mounting plate portion 54 of the first mounting member 16 onto the power unit with a fastening bolt passed through the bolt passage hole 56, and mounting the second mounting member 18 onto the body with a fastening bolt via the tubular bracket 158.

Installed in this fashion, when vibration is input across the first mounting member 16 and the second mounting member 18, fluid flow is created through the orifice passage 118 on the basis of a pressure differential arising between the pressure-receiving chamber 106 and the equilibrium chamber 112 in association with deformation of the main rubber elastic body 20, and passive vibration damping is produced on the basis of flow action such as resonance action of this fluid.

Additionally, by actuated oscillation of the oscillator member 78 by the electromagnetic actuator 14 through control of energization of the coil 128 according to the frequency or phase of the vibration to be damped, the vibration input chamber 108 may be subjected to pressure fluctuations from the oscillation chamber 110 through the orifice passages 102, to obtain active vibration damping of input vibration through active control of pressure fluctuations in the vibration input chamber 108.

In this regard, higher output and improved consistency of output characteristics of the electromagnetic actuator 14 are attained by adopting particular sinuous contours for the longitudinal cross section of the supporting rubber elastic body 82 in the engine mount 10.

Turning now to a more detailed description, an inside peripheral recessed portion 164 and an outside peripheral protruding portion 166 are formed on the upper face of the supporting rubber elastic body 82. The inside peripheral recessed portion 164 is formed in the inside peripheral section of the supporting rubber elastic body 82 which is located outwardly and spaced away from the portion anchored to the oscillator member 78, and extends continuously about the entire circumference. The inside peripheral recessed portion 164 in longitudinal cross section has contours open towards the top, with the center of curvature established above the upper face of the supporting rubber elastic body 82.

The outside peripheral protruding portion 166 is formed in the outside peripheral section of the supporting rubber elastic body 82 which is located inwardly and spaced away from the portion anchored to the annular supporting member 80, and extends continuously about the entire circumference to the outside peripheral side of the inside peripheral recessed portion 164. The outside peripheral protruding portion 166 in longitudinal cross section has gentle upward-protruding mounded contours and a center of curvature established below the upper face of the supporting rubber elastic body 82.

The outside peripheral edge of the inside peripheral recessed portion 164 and the inside peripheral edge of the outside peripheral protruding portion 166 connect smoothly to define along the entire upper face of the supporting rubber elastic body 82 a smooth curving face devoid of any knee point. Viewed in longitudinal cross section, the contours of the upper face of the supporting rubber elastic body 82 have a single inflection point situated at the point of connection of the inside peripheral recessed portion 164 to the outside peripheral protruding portion 166.

Viewed in longitudinal cross section of the supporting rubber elastic body 82, at the point of connection of the inside peripheral recessed portion 164 with the outside peripheral protruding portion 166 (the inflection point), the size of the angle formed by the tangent with respect to the axial direction, in other words, the minimum value: $\alpha_1$ (see FIG. 2) of the slope angle at the inside peripheral corner of the upper face of the supporting rubber elastic body 82, is preferably within the range $0° < \alpha_1 \leq 90°$. More preferably, the minimum value: $\alpha_1$ of the slope angle is within the range $50° \leq \alpha_1 \leq 90°$.

An inside peripheral protruding portion 168 and an outside peripheral recessed portion 170 are formed on the lower face of the supporting rubber elastic body 82. The inside peripheral protruding portion 168 is formed in the inside peripheral section of the supporting rubber elastic body 82 which is located outwardly and spaced away from the portion anchored to the oscillator member 78, and extends continuously about the entire circumference. The inside peripheral protruding portion 168 in longitudinal cross section has gentle downward-protruding mounded contours and a center of curvature established above the lower face of the supporting rubber elastic body 82.

The outside peripheral recessed portion 170 is formed in the outside peripheral section of the supporting rubber elastic body 82 which is located inwardly and spaced away from the portion anchored to the annular supporting member 80, and extends continuously about the entire circumference to the outside peripheral side of the inside peripheral protruding portion 168. The outside peripheral recessed portion 170 in longitudinal cross section has recessed contours open towards the bottom and a center of curvature established below the lower face of the supporting rubber elastic body 82.

The outside peripheral edge of the inside peripheral protruding portion 168 and the inside peripheral edge of the outside peripheral recessed portion 170 connect smoothly to define along the entire lower face of the supporting rubber elastic body 82 a smooth curving face devoid of any knee point. Viewed in longitudinal cross section, the contours of the lower face of the supporting rubber elastic body 82 have a single inflection point situated at the point of connection of the inside peripheral protruding portion 168 to the outside peripheral recessed portion 170.

Viewed in longitudinal cross section of the supporting rubber elastic body 82, at the point of connection of the inside peripheral protruding portion 168 and the outside peripheral recessed portion 170 (the inflection point), the size of the angle formed by the tangent with respect to the axial direction, in other words, the minimum value: $\beta_1$ (see FIG. 2) of the slope angle at the outside peripheral corner of the lower face of the supporting rubber elastic body 82, is preferably within the range $0° < \beta_1 \leq 90°$. More preferably, the minimum value: $\beta_1$ of the slope angle is within the range $50° \leq \beta_1 \leq 90°$.

By forming the protruding portions 166, 168 and the recessed portions 164, 170 on the upper and lower faces of the supporting rubber elastic body 82 in this way, the supporting rubber elastic body 82 is provided at its inside peripheral side with a valley-shaped portion 172 having concave curving contours which face upward, and at its outside peripheral side with a peak-shaped portion 174 having convex curving contours which face upward. As depicted in FIG. 2, by so doing a single inflection point is established in the medial section, on an axis of elasticity: $l_1$ that extends in the diametrical direction of the supporting rubber elastic body 82. This axis of elasticity: $l_1$ has a laterally rotated S trajectory overall, in which the segment to the inside peripheral side of the inflection point is a concave upward-facing valley segment with a curvature center lying on the upper side, and the segment to the outside peripheral side of the inflection point is an convex upward-facing peak segment with a curvature center lying on the lower side. Additionally, owing to the generally S-shaped sinuous trajectory of the axis of elasticity: $l_1$, at one location in the lengthwise medial section the axis of elasticity: $l_1$ intersects a hypothetical line segment connecting the end anchored to the oscillator member 78 with the end anchored to the annular supporting member 80 (the reference line depicted by a double-dot and dash line in FIG. 2). In the present embodiment in particular, the axis of elasticity: $l_1$ also intersects at one location a hypothetical line segment connecting the axial center of the annular connecting portion 84 of the oscillator member 78 with the axial center of the cylindrical portion 92 of the annular supporting member 80.

In the stationary state in the absence of input vibration, the axis of elasticity: $l_1$ on the whole extends in the approximately axis-perpendicular direction. The axis of elasticity: $l_1$ may also be referred to as a principal axis of elasticity extending in the radial direction viewed in longitudinal cross section of the supporting rubber elastic body 82.

In the present embodiment, both the inside peripheral anchoring face 99 and the outside peripheral anchoring face 101 are defined by round cylindrical faces extending approximately parallel to the axial direction, and the line segment connecting the axial center of the inside peripheral anchoring face 99 and the axial center of the outside peripheral anchoring face 101 intersects the axis of elasticity: $l_1$ of the supporting rubber elastic body 82 at a single location. However, it is not essential for the inside peripheral anchoring face 99 and the outside peripheral anchoring face 101 to be extended parallel to the axial direction; as alternative examples, the outside peripheral anchoring face and/or the inside peripheral anchoring face may incline with respect to the axial direction, or may curve along the axial direction to create varying slope angle with respect to the axial direction. In preferred practice, if the outside peripheral anchoring face and/or the inside peripheral anchoring face inclines with respect to the axial direction, the slope angle with respect to the axial direction will be no more than 45°.

The axial thickness dimension: $t_1$ of the inside peripheral section (the valley-shaped portion 172) is greater than the axial thickness dimension: $t_2$ of the outside peripheral section (the peak-shaped portion 174), giving the supporting rubber elastic body 82 overall contours that are progressively thicker towards the inside peripheral side. This has the effect of preventing damage such as cracking from occurring in the inside peripheral section of the supporting rubber elastic body 82 so as to advantageously ensure ample durability of the supporting rubber elastic body 82. In order to effectively give rise to the non-linear spring characteristics discussed later, the thickness dimension: $t_1$ of the thicker inside peripheral section is no more than double the thickness dimension: $t_2$ of the outside peripheral section (i.e. $t_1 \leq t_2$).

By virtue of the sinuous contours of the longitudinal cross section described above, the supporting rubber elastic body 82 is endowed with spring characteristics such that the spring constant will increase in non-linear fashion in association with increasing deformation resulting from downward displacement of the movable member 124 relative to the stator 122. One possible explanation as to why such spring characteristics arise is discussed below.

Specifically, in the initial phase of actuation of the movable member 124 while it is still a considerable distance apart from the magnetic pole on the stator 122 side, owing to the sinuous contours of the supporting rubber elastic body 82, the supporting rubber elastic body 82 gives rise primarily to shearing deformation. Thus, the spring constant is held at a low level so that actuated displacement of the movable member 124 may take place efficiently with minimal generative force. Moreover, because the supporting rubber elastic body 82 has slack in the axial direction, in the initial phase of actuation with the level of deformation of the supporting rubber elastic body 82 at a minimum, the movable member 124 undergoes actuated displacement without any resistance caused by the elasticity of the supporting rubber elastic body 82.

On the other hand, as the movable member 124 experiences actuated displacement and the level of deformation of the supporting rubber elastic body 82 increases in association with displacement of the movable member 124, an increase in tensile spring component in the supporting rubber elastic body 82 gives rise to a sharp non-linear increase of the spring constant. In particular, as deformation of the supporting rubber elastic body 82 becomes sufficiently great to the point that the curved sections are substantially extended, the tensile spring component becomes dominant in the supporting rubber elastic body 82, and the spring constant increases. As a result, the sharply increasing kinetic energy of the movable member 124 associated with displacement of the movable member 124 closer towards the magnetic pole is efficiently absorbed and stored by the supporting rubber elastic body 82, thus reducing the displacement speed of the movable member 124. Consequently, it is easy to control actuated displacement of the movable member 124 within a range of small separation distance from the magnetic pole within which a high level of generative force may be attained.

It is possible thereby to establish a small initial separation distance between the movable member 124 and the stator 122, so as to efficiently obtain actuating force of the movable member 124, as well as preventing the movable member 124 from striking against other components due to excessive displacement, and the associated noise. Moreover, because the output characteristics of oscillatory force exerted on the oscillator member 78 by the movable member 124 are stabilized, more efficient active vibration damping of vibration of the targeted frequency may be attained.

On the electromagnetic actuator 14 end, utilizing the elastic force of the supporting rubber elastic body 82, it is possible to reduce the variability range of output characteristics with respect to deviations among products in terms of the separation distance between the movable member 124 and the magnetic pole resulting from factors such as dimensional errors or assembly errors of components. For this reason, during volume production it is possible to provide engine mounts 10 that consistently meet the required vibration damping capability requirements.

Figure 3:
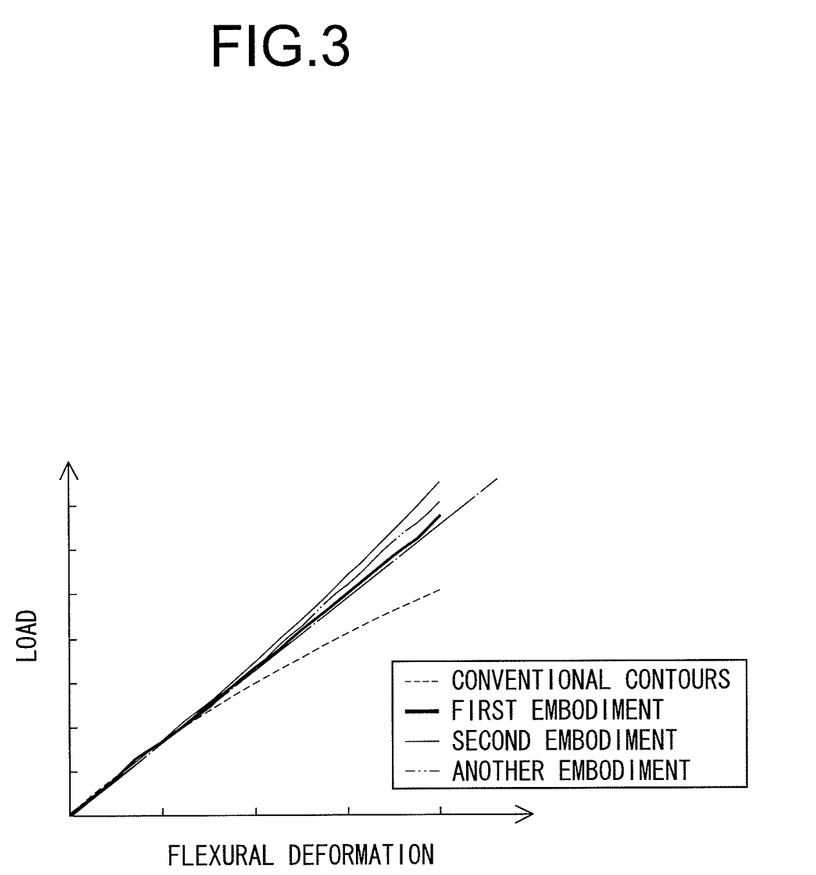
FIG. 3 is a graph showing load-flexural deformation characteristics of a supporting rubber elastic body of the engine mount.

The spring characteristics of the supporting rubber elastic body 82 herein will be appreciated from the graph depicted in FIG. 3, which is based on test data. Specifically, FIG. 3 plots the relationship of load exerted on the supporting rubber elastic body 82 by displacement of the movable member 124 (vertical axis), to flexural deformation of the supporting rubber elastic body 82 (horizontal axis). It shows that with the supporting rubber elastic body 82 according to the present invention, spring constant increases with increasing deformation, to a greater extent than observed with a supporting rubber elastic body of conventional contours having an upwardly convex peak-shaped cross section, indicated by the broken line. Accordingly, the test results also provide clear evidence that the excellent advantages discussed above may be attained by employing this supporting rubber elastic body 82 in the electromagnetic actuator 14. The dot and dash line in the graph indicates characteristics of a supporting rubber elastic body having the same initial spring constant as the supporting rubber elastic body 82, but with linear spring characteristics.

Figure 4:
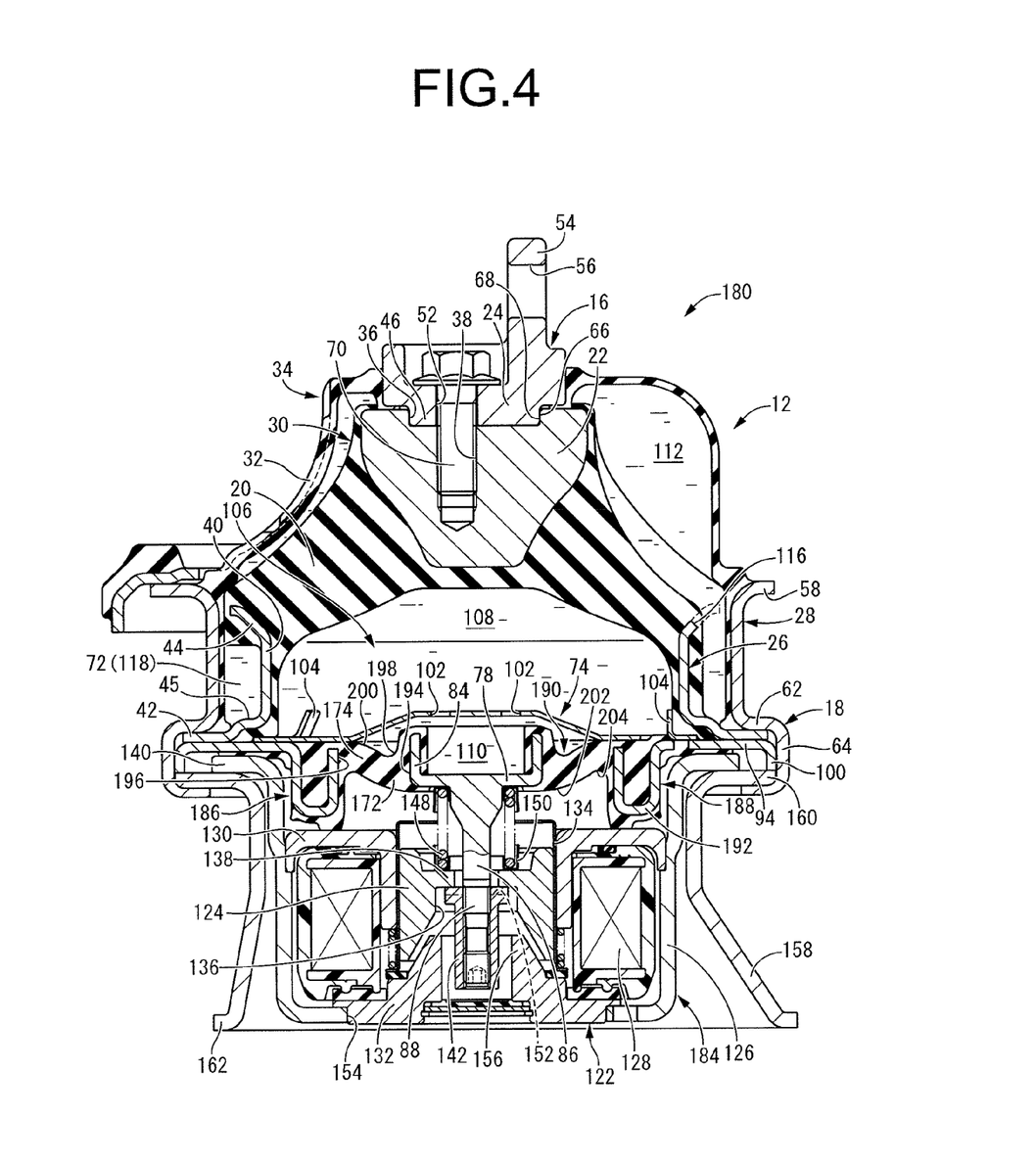
FIG. 4 is an elevational view in axial or vertical cross section of an engine mount according to a second embodiment of the present invention.

Turning now to FIG. 4, there is shown an automotive engine mount 180 according to a second embodiment of the fluid-filled active vibration damping device constructed according to the present invention. The engine mount 180 has a structure produced by attaching an electromagnetic actuator 184 to a mount body 12; additionally, the electromagnetic actuator 184 has a supporting member 186. In the following description, components and parts substantially identical to those in the first embodiment are assigned the same drawing symbols and are not discussed.

To describe in more detail, the supporting member 186 is constructed from an annular supporting member 188 and an oscillator member 78 elastically linked by a supporting rubber elastic body 190. The annular supporting member 188 is a rigid member having generally annular shape overall, and composed of an integrally formed annular anchor portion 192 of grooved cross section open at the top extending along an annular trajectory in the circumferential direction, a mounting plate 94 of annular disk shape projecting outward in the axis-perpendicular direction from the upper edge of the outside peripheral wall of the annular anchor portion 192, and a pressure fitting portion 100 of annular shape projecting downward from the outside peripheral edge of the mounting plate 94.

The annular supporting member 188 constructed in this fashion is secured with its outside peripheral section swaged to the second mounting member 18 via a swaging piece 64 provided to the flexible film outer fitting 28. Meanwhile, an oscillator member 78 is positioned to the inside peripheral side of the annular supporting member 188 and diametrically spaced apart therefrom, with the oscillator member 78 disposed at a location relatively biased towards the upward direction in relation to the annular supporting member 188. A supporting rubber elastic body 190 is disposed between the annular supporting member 188 and the oscillator member 78, so that the annular supporting member 188 and the oscillator member 78 are elastically linked by the supporting rubber elastic body 190.

The supporting rubber elastic body 190 resembles an annular disk overall, the inside peripheral face of which is vulcanization bonded to the outside peripheral face of the annular connecting portion 84 of the oscillator member 78 (inside peripheral anchoring face 194), and the outside peripheral face of which is vulcanization bonded to the inside peripheral face of the annular anchor portion 192 of the annular supporting member 188 (outside peripheral anchoring face 196). The oscillator member 78 is thereby elastically linked to the annular supporting member 188, and relative displacement of the oscillator member 78 in the axial direction with respect to the annular supporting member 188 is limited by the elasticity of the supporting rubber elastic body 190. Here, as in the first embodiment, the inside peripheral anchoring face 194 and the outside peripheral anchoring face 196 are disposed on a relative bias in the axial direction, with the inside peripheral anchoring face 194 extending further upward than the outside peripheral anchoring face 196.

Figure 5:
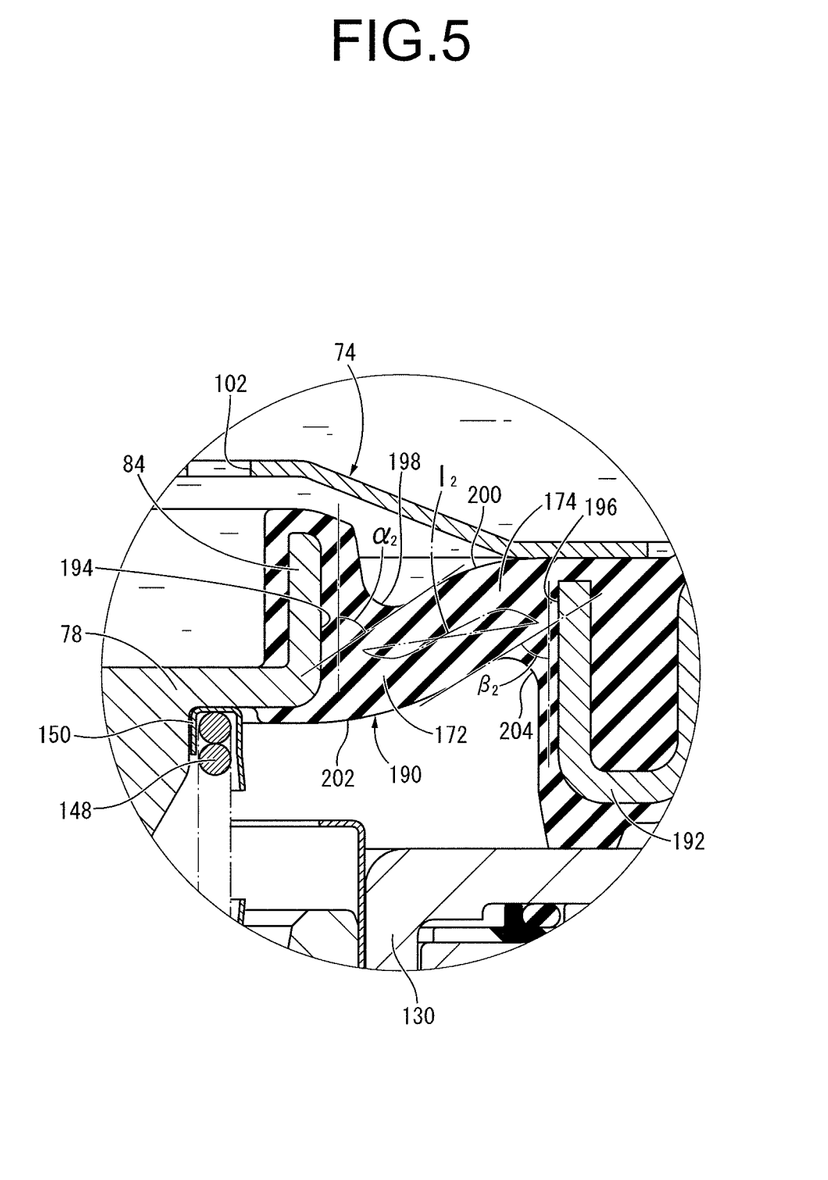
FIG. 5 is an enlarged view in axial or vertical cross section showing a principle part of the engine mount of FIG. 4.

An inside peripheral recessed portion 198 and an outside peripheral protruding portion 200 are formed in continuous fashion on the upper face of the supporting rubber elastic body 190. Like the inside peripheral recessed portion 164 of the first embodiment, the inside peripheral recessed portion 198 is an upward opening recess having its center of curvature established to the upper side of the upper face of the supporting rubber elastic body 190 formed in continuous fashion about the entire circumference. Like the outside peripheral protruding portion 166 of the first embodiment, the outside peripheral protruding portion 200 is an upward-facing protrusion having a center of curvature established to the lower side of the upper face of the supporting rubber elastic body 190.

Viewed in longitudinal cross section of the supporting rubber elastic body 190, the size of the angle: $\alpha_2$ (see FIG. 5) formed by a common tangent with respect to the axial direction at the inflection point of the inside peripheral recessed portion 198 and the outside peripheral protruding portion 200 is preferably within the range $0°<\alpha_2\leq 90°$. In particular, the slope angle: $\alpha_2$ of the present embodiment is smaller than the slope angle: $\alpha_1$ of the first embodiment ($\alpha_2<\alpha_1$), and more preferably within the range $30°\leq\alpha_2\leq 60°$.

Meanwhile, an inside peripheral protruding portion 202 and an outside peripheral recessed portion 204 are formed in continuous fashion on the lower face of the supporting rubber elastic body 190. Like the inside peripheral protruding portion 168 of the first embodiment, the inside peripheral protruding portion 202 is an upward-facing protrusion formed in continuous fashion about the entire circumference and having a center of curvature established to the upper side of the lower face of the supporting rubber elastic body 190. Like the outside peripheral recessed portion 170 of the first embodiment, the outside peripheral recessed portion 204 is a downward-opening recess formed in continuous fashion about the entire circumference and having a center of curvature established to the lower side of the lower face of the supporting rubber elastic body 190.

Viewed in longitudinal cross section of the supporting rubber elastic body 190, the size of the angle: $\beta_2$ (see FIG. 5) formed by a common tangent with respect to the axial direction at the inflection point of the inside peripheral protruding portion 202 and the outside peripheral recessed portion 204 is preferably within the range $0°<\beta_2\leq 90°$. In particular, the slope angle: $\beta_2$ of the present embodiment is smaller than the slope angle: $\beta_1$ of the first embodiment ($\beta_2<\beta_1$), more preferably within the range $30°\leq\beta_2\leq 60°$.

As shown in FIG. 5, in the supporting rubber elastic body 190 of the present embodiment there is established an axis of elasticity: $l_2$ having a sinuous trajectory (laterally rotated S trajectory) comparable to the axis of elasticity: $l_1$ of the supporting rubber elastic body 82 of the first embodiment. At one location in the lengthwise medial section, the axis of elasticity: $l_2$ intersects a reference line that connects the two ends thereof in a straight line (the double-dot and dash line in FIG. 5). At one location in the lengthwise medial section, the axis of elasticity: $l_2$ also intersects a hypothetical line segment that connects the axial center of the annular connecting portion 84 to the axial center of the inside peripheral wall of the cylindrical portion 92.

In the supporting rubber elastic body 190 incorporated into the engine mount 180 according to the present embodiment, the minimum value of the slope angle of the supporting rubber elastic body 190 with respect to the axial direction is smaller in the diametrical medial section, and the inside peripheral recessed portion 198 and the outside peripheral recessed portion 204 are formed so as to burrow into the supporting rubber elastic body 190. As shown by the fine solid line in FIG. 3, the supporting rubber elastic body 190 constructed in the above manner exhibits markedly greater increase of spring constant in response to increasing deformation (flexion) as compared with the supporting rubber elastic body 82 of the first embodiment indicated by the heavy solid line, and it may be appreciated that non-linear spring characteristics may be achieved more advantageously thereby. Accordingly, the test results also show that further improvement in energy efficiency in an electromagnetic actuator 184 may be attained by employing this supporting rubber elastic body 190 in the electromagnetic actuator 184.

Figure 6:
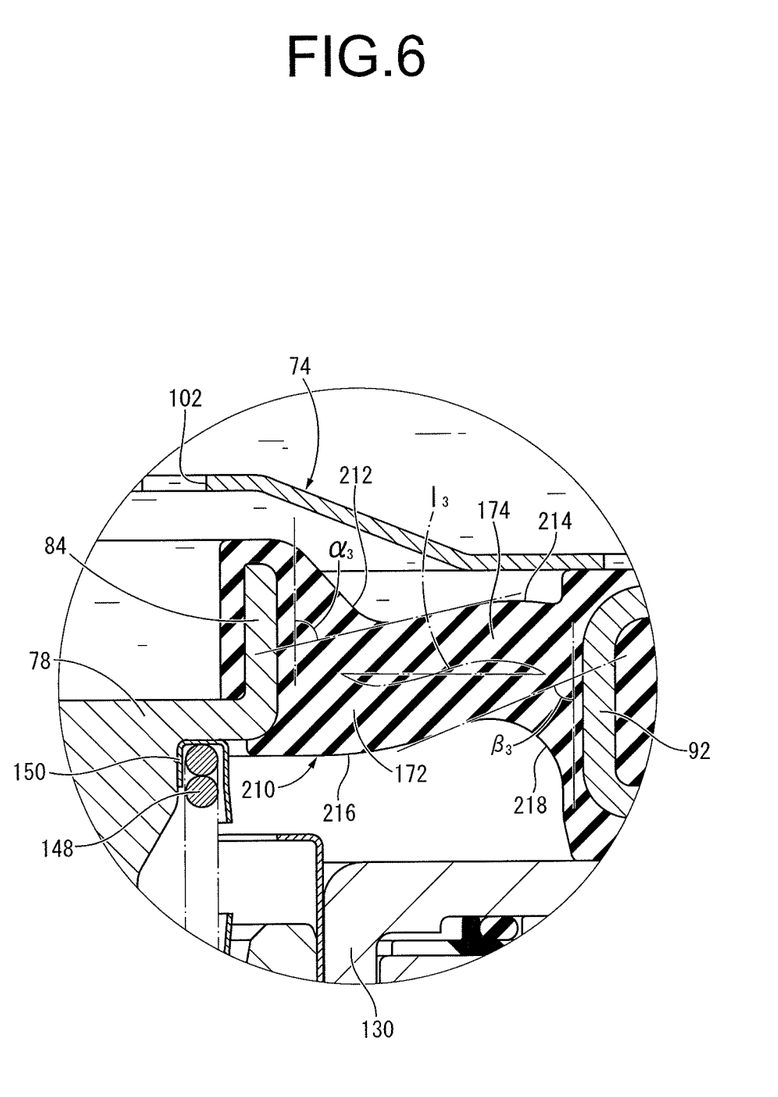
FIG. 6 is an enlarged view in axial or vertical cross section showing a principle part of an engine mount according to another embodiment of the present invention.

The advantages which are objects of the present invention may also be effectively achieved by employing a transitional morphology somewhere between that of the supporting rubber elastic body 82 of the first embodiment and that of the supporting rubber elastic body 190 of the second embodiment, such as the supporting rubber elastic body 210 depicted in FIG. 6. Specifically, in the supporting rubber elastic body 210, the angle: $\alpha_3$ formed by a common tangent with respect to the axial direction at the connection point (inflection point) of an inside peripheral recessed portion 212 and an outside peripheral protruding portion 214 formed on the upper face is set within a range such that $\alpha_2<\alpha_3<\alpha_1$, and preferably within the range $40°<\alpha_3\leq 80°$. Additionally, the angle: $\beta_3$ formed by a common tangent with respect to the axial direction at the connection point of an inside peripheral protruding portion 216 and an outside peripheral recessed portion 218 formed on the lower face of the supporting rubber elastic body 210 is set within a range such that $\beta_2<\beta_3<\beta_1$, preferably within the range $40°<\beta_3\leq 80°$. The inside peripheral recessed portion 212, the outside peripheral protruding portion 214, the inside peripheral protruding portion 216, and the outside peripheral recessed portion 218 are substantially identical in structure to those shown in the first and second embodiments, and are not discussed in detail here.

As shown in FIG. 6, in the supporting rubber elastic body 210 of the present embodiment there is established an axis of elasticity: $l_3$ having a sinuous trajectory (laterally rotated S trajectory) comparable to the axis of elasticity: $l_1$, $l_2$ of the supporting rubber elastic body 82, 190 of the first and second embodiments. At one location in the lengthwise medial section, the axis of elasticity: $l_3$ intersects a reference line that connects the two ends thereof in a straight line (the double-dot and dash line in FIG. 6). At one location in the lengthwise medial section, the axis of elasticity: $l_3$ also intersects a hypothetical line segment that connects the axial center of the annular connecting portion 84 to the axial center of the cylindrical portion 92.

According to this supporting rubber elastic body 210, there may be attained characteristics that, as shown by the double-dot and dash line in FIG. 3, lie somewhere between the characteristics of the supporting rubber elastic body 82 of the first embodiment (the heavy solid line in FIG. 6) and the characteristics of the supporting rubber elastic body 190 of the second embodiment (the fine solid line in FIG. 3). Accordingly, as in the first and second embodiments, the various advantages which are objects of the present invention may also be effectively achieved with an electromagnetic actuator furnished with the supporting rubber elastic body 210.

While certain preferred embodiments of the present invention have been set forth in detail herein, the present invention is not limited to the specific disclosures therein. It is possible for example to instead adopt a structure in which the inside peripheral protruding portion and the outside peripheral recessed portion are formed on the upper face of the supporting rubber elastic body while the inside peripheral recessed portion and the outside peripheral protruding portion are formed on the lower face of the supporting rubber elastic body, thus imparting to the principal axis of elasticity of the supporting rubber elastic body a curving trajectory having a peak segment situated towards the inside peripheral side and a valley segment situated towards the outside peripheral side. Specifically, the cross sectional contours of the supporting rubber elastic body may be have laterally rotated inverted S shape, which is even more advantageous in terms of preventing contact between the inside peripheral section of the supporting rubber elastic body and the guide sleeve 134.

No limitations are imposed with regard to the direction of projection (i.e. the slope angle with respect to the axial direction) of the inside peripheral section of the supporting rubber elastic body anchored to the oscillator member or of the outside peripheral section of the supporting rubber elastic body anchored to the annular supporting member, and these may extend along an upward sloping trajectory with respect to the axis-perpendicular direction, or conversely extend along a downward sloping trajectory with respect to the axis-perpendicular direction. The inside and outside peripheral sections of the supporting rubber elastic body may also extend in the axis-perpendicular direction for example.

The supporting rubber elastic body may also be provided with two or more inflection points on its center axis of elasticity, to impart a sinuous trajectory having a plurality of peak segments or valley segments. In this case as well, it is preferable for the center axis of elasticity of the supporting rubber elastic body to intersect at least at a single location a line segment connecting both of its ends.

It is not essential for the supporting rubber elastic body to have an axial thickness dimension of the inside peripheral section that is greater than the axial thickness dimension of the outside peripheral section, and an arrangement in which the inside peripheral section and the outside peripheral section are equal in thickness, or in which the outside peripheral section is thicker than the inside peripheral section, may also be adopted. Where the outside peripheral section of the supporting rubber elastic body is thicker than the inside peripheral section, the axial thickness dimension ($t_2$) of the outside peripheral section is preferably set to no more than double the axial thickness dimension ($t_1$) of the inside peripheral section ($t_2 \leq t_1$).

It is not essential for the faces located at both axial sides of the supporting rubber elastic body to have smoothly curving contours in longitudinal cross section as depicted in FIG. 1, and may instead incorporate angled portions or knee points as they extend in the axis-perpendicular direction. As a specific example, at least one of the inside peripheral recessed portion, the outside peripheral protruding portion, the inside peripheral protruding portion, and the outside peripheral recessed portion may be given angular contours by combining surfaces lying in several planes.

In the preceding embodiments, reciprocating displacement of the movable member 124 is brought about through interactions of attractive force created by the action of magnetism and the recovery force of the supporting rubber elastic body 82, but it would be possible to adopt an arrangement whereby these actions are supplemented by actuating force utilizing the elasticity of a metal plate spring or coil spring for example.

It is not necessary for displacement of the movable member to be regulated exclusively by the elasticity of the supporting rubber elastic body to prevent it from striking other components, and it would be acceptable to provide for example a stopper member made of a rubber elastic body, so that the stopper member provides supplemental regulation of displacement of the movable member.

The present invention is not limited to implementation in an electromagnetic actuator for use in a fluid-filled active vibration damping device, and has potential application in electromagnetic actuators for use in an active vibration damper that produces offsetting damping action through oscillating displacement of a mass. Additionally, fluid-filled active vibration damping devices furnished with the electromagnetic actuator according to the invention are not limited to automotive applications, and may be employed in fluid-filled active vibration damping devices for installation in rolling stock, commercial vehicles, and the like. Fluid-filled active vibration damping devices furnished with the electromagnetic actuator according to the invention are not limited to application in engine mounts, and may also be employed in subframe mounts, diff mounts, and the like.

What is claimed is:

1. An electromagnetic actuator comprising:
   a stator having a stator magnetic path provided by yoke members attached about a circumference of a coil;
   a movable member disposed in a center hole of the coil, the movable member being actuated in an axial direction of the coil through action of a magnetic field generated by energizing the coil;
   an annular supporting member secured to the stator;
   an oscillator member secured to the movable member while being disposed in opposition to the annular supporting member across a gap in an axis-perpendicular direction; and
   a supporting rubber elastic body of annular plate shape disposed between opposing faces of the annular supporting member and the oscillator member in the axis-perpendicular direction, and elastically linking the oscillator member to the annular supporting member,
   wherein the supporting rubber elastic body includes a thin walled portion, and at the thin walled portion, one axial face of the supporting rubber elastic body is furnished with an inside peripheral recessed portion and a first outside peripheral protruding portion while another axial face of the supporting rubber elastic body is furnished with a first inside peripheral protruding portion and an outside peripheral recessed portion.

2. The electromagnetic actuator according to claim 1, wherein the movable member undergoes reciprocating oscillatory displacement on the basis of alternating action of actuating force exerted on the movable member by the action of the magnetic field generated by energizing the coil, and of elastic recovery force of the supporting rubber elastic body upon experiencing deformation in association with displacement of the movable member.

3. The electromagnetic actuator according to claim 1, wherein the supporting rubber elastic body has an elastic center axis, and at least one inflection point is established on the elastic center axis of the supporting rubber elastic body.

4. The electromagnetic actuator according to claim 3, wherein a single inflection point is provided on the elastic center axis of the supporting rubber elastic body, and the elastic center axis curves along the sinuous trajectory of the interconnected peak segment and valley segment situated to either side of the inflection point.

5. The electromagnetic actuator according to claim 1, wherein an inside peripheral anchoring face lying towards the oscillator member to which an inside peripheral edge of the supporting rubber elastic body is anchored, and an outside peripheral anchoring face lying towards the annular supporting member to which an outside peripheral edge of the supporting rubber elastic body is anchored, are disposed in relative eccentricity in the axial direction of the coil; in an inside peripheral section of the supporting rubber elastic body, the one axial face which is situated on an opposite side from the axial direction of relative eccentricity of the outside peripheral anchoring face with respect to the inside peripheral anchoring face has a slope angle with a minimum value of 90 degrees or less with respect to an axial line extending through an inside peripheral corner of the one axial face; and in an outside peripheral section of the supporting rubber elastic body, the other axial face situated on an opposite side from the axial direction of relative eccentricity of the inside peripheral anchoring face with respect to the outside peripheral anchoring face has a slope angle with a minimum value of 90 degrees or less with respect to an axial line extending through an outside peripheral corner of the other axial face.

6. The electromagnetic actuator according to claim 1, wherein the elastic center axis of the supporting rubber elastic body intersects at least at one location in a lengthwise medial section a reference line consisting of a straight line connecting a location on the annular supporting member and a location on the oscillator member along the elastic center axis.

7. The electromagnetic actuator according to claim 1, wherein the supporting rubber elastic body has an elastic center axis, and the elastic center axis curves along a sinuous trajectory of an interconnected peak segment and valley segment situated between the opposing faces of the annular supporting member and the oscillator member in the axis-perpendicular direction.

8. The electromagnetic actuator according to claim 1, wherein in the one axial face of the supporting rubber elastic body at the thin walled portion, the inside peripheral recessed portion has a first center of curvature in a longitudinal cross section,
in the one axial face of the supporting rubber elastic body at the thin walled portion, the first outside peripheral protruding portion has a second center of curvature in the longitudinal cross section,
in the other axial face of the supporting rubber elastic body at the thin walled portion, the first inside peripheral protruding portion has a third center of curvature in the longitudinal cross section,
in the other axial face of the supporting rubber elastic body at the thin walled portion, the outside peripheral recessed portion has a fourth center of curvature in the longitudinal cross section,
the one axial face of the supporting rubber elastic body constitutes an axially upper face of the supporting rubber elastic body, while the other axial face of the supporting rubber elastic body constitutes an axially lower face of the supporting rubber elastic body,
the first center of curvature is established above the axially upper face of the supporting rubber elastic body,
the second center of curvature is established below the axially upper face of the supporting rubber elastic body,
the third center of curvature is established above the axially lower face of the supporting rubber elastic body, and
the fourth center of curvature is established below the axially lower face of the supporting rubber elastic body.

9. The electromagnetic actuator according to claim 1, wherein in the one axial face of the supporting rubber elastic body, an outside peripheral edge of the inside peripheral recessed portion and an inside peripheral edge of the first outside peripheral protruding portion connect smoothly with no knee point, and an inflection point is situated at a point of connection of the inside peripheral recessed portion and the first outside peripheral protruding portion in a longitudinal cross section, and
in the other axial face of the supporting rubber elastic body, an outside peripheral edge of the first inside peripheral protruding portion and an inside peripheral edge of the outside peripheral recessed portion connect smoothly with no knee point, and an inflection point is situated at a point of connection of the first inside peripheral protruding portion and the outside peripheral recessed portion in the longitudinal cross section.

10. The electromagnetic actuator according to claim 1, wherein
the one axial face of the supporting rubber elastic body constitutes an axially upper face of the supporting rubber elastic body, while the other axial face of the supporting rubber elastic body constitutes an axially lower face of the supporting rubber elastic body,
in the one axial face of the supporting rubber elastic body, an extreme point of the inside peripheral recessed portion is located axially below an extreme point of the first outside peripheral protruding portion, and
in the other axial face of the supporting rubber elastic body, an extreme point of the first inside peripheral protruding portion is located axially below an extreme point of the outside peripheral recessed portion.

11. The electromagnetic actuator according to claim 1, further comprising:
a second inside peripheral protruding portion located radially inside of the inside peripheral recessed portion in the one axial face of the supporting rubber elastic body;
a second outside peripheral protruding portion located radially outside of the first outside peripheral protruding portion in the one axial face of the supporting rubber elastic body;
a third inside peripheral protruding portion located radially inside of the first inside peripheral protruding portion in the other axial face of the supporting rubber elastic body; and
a third outside peripheral protruding portion located radially outside of the outside peripheral recessed portion in the other axial face of the supporting rubber elastic body.

12. The electromagnetic actuator according to claim 11, wherein the thin walled portion of the supporting rubber elastic body is located radially outside of the second inside peripheral protruding portion and radially inside of the second outside peripheral protruding portion in the one axial face of the supporting rubber elastic body, and is located radially outside of the third inside peripheral protruding portion and radially inside of the third outside peripheral protruding portion in the other axial face of the supporting rubber elastic body.

13. The electromagnetic actuator according to claim 1, wherein the one axial face of the supporting rubber elastic body constitutes an axially upper face of the supporting rubber elastic body, which the other axial face of the supporting rubber elastic body constitutes an axially lower face of the supporting rubber elastic body,
the supporting rubber elastic body has geometric features such that: in the one axial face of the supporting rubber elastic body, a straight line passing through an extreme point of the inside peripheral recessed portion and an extreme point of the first outside peripheral protruding portion extends axially upwardly as it goes radially outwardly with a constant gradient; and in the other axial face of the supporting rubber elastic body, a straight line passing through an extreme point of the first inside peripheral protruding portion and an extreme point of the outside peripheral recessed portion extends axially upwardly as it goes radially outwardly with a constant gradient.

14. The electromagnetic actuator according to claim 1, wherein a first rubber elastic body layer is provided on the opposing face of the oscillator member to which an inside rim of the supporting rubber elastic body is fixed, a second rubber elastic body layer is provided on the opposing face of the annular supporting member to which an outside rim of the supporting rubber elastic body is fixed, and the thin walled portion of the supporting rubber elastic body is disposed between opposed faces of the first and second rubber elastic body layers.

15. A fluid-filled active vibration damping device comprising:

a first mounting member disposed spaced apart from an axial opening of a second mounting member having cylindrical shape;

a main rubber elastic body linking the first mounting member and the second mounting member;

a pressure-receiving chamber formed therein and a portion of whose wall being defined by the main rubber elastic body;

an equilibrium chamber a portion of whose wall being defined by a flexible film, the pressure-receiving chamber and the equilibrium chamber being filled with a non-compressible fluid; and an orifice passage interconnecting the pressure-receiving chamber and the equilibrium chamber, wherein:

the device comprises an electromagnetic actuator including: a stator having a stator magnetic path provided by yoke members attached about a circumference of a coil; a movable member disposed in a center hole of the coil, the movable member being actuated in an axial direction of the coil through action of a magnetic field generated by energizing the coil; an annular supporting member secured to the stator and an oscillator member secured to the movable member that are disposed in opposition across a gap in an axis-perpendicular direction; and a supporting rubber elastic body of annular plate shape disposed between opposing faces of the annular supporting member and the oscillator member in the axis-perpendicular direction, and elastically linking the oscillator member to the annular supporting member, such that the supporting rubber elastic body includes a thin walled portion, and at the thin walled portion, one axial face of the supporting rubber elastic body is furnished with an inside peripheral recessed portion and a first outside peripheral protruding portion while another axial face of the supporting rubber elastic body is furnished with a first inside peripheral protruding portion and an outside peripheral recessed portion;

another portion of the wall of the pressure-receiving chamber is defined by the oscillator member; the annular supporting member is secured to the second mounting member; and the oscillator member and the annular supporting member are linked by the supporting rubber elastic body.

* * * * *